B. PAYNE.

Method of Necking Cartridge-Cases.

No. 6,521. Reissued June 29, 1875.

Witnesses

Geo. M. Hall

M. M. Leggett.

Inventor

Bingham Payne

By his Attorney

S. W. Wood

UNITED STATES PATENT OFFICE.

BRIGHAM PAYNE, OF HARTFORD, CONNECTICUT, ASSIGNOR TO J. R. SCHUYLER, M. HARTLEY, AND M. GRAHAM.

IMPROVEMENT IN METHODS OF NECKING CARTRIDGE-CASES.

Specification forming part of Letters Patent No. 50,489, dated October 17, 1865; reissue No. 3,793, dated January 11, 1870; reissue No. 6,521, dated June 29, 1875; application filed September 4, 1872.

DIVISION B.

*To all whom it may concern:*

Be it known that I, BRIGHAM PAYNE, of Hartford, county of Hartford and State of Connecticut, have invented an Improvement in the Art of Manufacturing Metallic Cases for Cartridges; and I do hereby declare that the following is a full, clear, and exact description thereof, reference being had to the annexed drawings, making part of this specification, in which—

Figure 1:
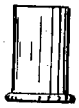
Figure 2:
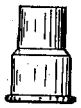
Figure 3:
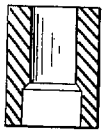

Figure 1 is a side external view of a metallic case for a cartridge of the usual form previous to being operated upon to receive my improvement. Fig. 2 is also a side external view of a metallic case for a cartridge after having been operated upon, and showing my improvement. Fig. 3 represents a central vertical section of one form of die employed in my improved art of manufacturing a metallic case for a cartridge.

The object of my invention is to produce a case for a metallic cartridge embracing such construction that the largest charge of powder may be used in a single case with a ball smaller than the main body or base thereof; and to this end my invention consists in forcing this case into a die having the form substantially as represented in Fig. 3, reducing, by compression or condensation, a sufficient portion of its front or open end to receive and hold the small ball.

As a practical method of making my improved metallic case for a cartridge, a machine adapted thereto is represented in the drawings attached to Letters Patent granted to me on the 17th day of October, 1865, and reissued on the 11th day of January, 1870, in which the hollow arbor moving up and down in a vertical plane with its tubular die, to receive and give form or "neck" the case in its downward motion by compressing or condensing a portion of the front end thereof, and a punch within this hollow arbor to force the reduced or "necked" and compressed case out of the die, so as to receive and shape the next succeeding case, which is presented, in turn, by a revolving dial-plate, also fully shown and described.

It is obvious that a variety of mechanism adapted thereto may be employed to perform the movements required in "necking" or reducing metallic cases for cartridges, so that small balls with larger cases may be used; but, as the die with its interior so formed as to impart the required shape to the case when the latter is forced into it, or die forced upon the case, is, in fact, the only essential feature in the mechanism in performing the actual reducing by compression of the case, I have confined my drawing to a simple illustration, in section, of one form of the die suitable for the operation, which, however, may be varied to suit the differently-formed chambers in the guns, in which the case should fit closely.

I claim—

As my improvement in the art of manufacturing metallic cartridge-cases, a process of necking or reduction of a portion of the shell to a lesser diameter, executed by a hollow die and the application of force to drive the case partly into the die, (or, as the equivalent thereof, to drive the die upon and around the case,) and thus force said case to contract in its diameter, substantially as herein set forth.

BRIGHAM PAYNE.

Witnesses:

EDWIN E. MARVIN,
LOREN P. WALDO.